United States Patent
Yokoyama

(10) Patent No.: US 12,479,287 B2
(45) Date of Patent: Nov. 25, 2025

(54) MOTOR CASE COMBINATION UNIT

(71) Applicant: JATCO Ltd, Fuji (JP)

(72) Inventor: Kazuhiko Yokoyama, Fuji (JP)

(73) Assignee: JATCO Ltd, Fuji (JP)

( * ) Notice: Subject to any disclaimer, the term of this patent is extended or adjusted under 35 U.S.C. 154(b) by 152 days.

(21) Appl. No.: 18/567,600

(22) PCT Filed: May 26, 2022

(86) PCT No.: PCT/JP2022/021493
§ 371 (c)(1),
(2) Date: Dec. 6, 2023

(87) PCT Pub. No.: WO2022/270211
PCT Pub. Date: Dec. 29, 2022

(65) Prior Publication Data
US 2024/0278636 A1    Aug. 22, 2024

(30) Foreign Application Priority Data
Jun. 24, 2021  (JP) ................... 2021-105239

(51) Int. Cl.
*B60K 11/04*  (2006.01)
*H02K 9/19*  (2006.01)
(52) U.S. Cl.
CPC ............... *B60K 11/04* (2013.01); *H02K 9/19* (2013.01)

(58) Field of Classification Search
CPC .......... B60K 11/04; B60K 6/40; B60K 11/02; B60K 1/00; H02K 9/19
USPC ......................................................... 165/41
See application file for complete search history.

(56) References Cited

U.S. PATENT DOCUMENTS

| | | | |
|---|---|---|---|
| 9,485,881 B2 * | 11/2016 | Nagamori ................ | H05K 5/03 |
| 12,077,049 B2 * | 9/2024 | Tanizawa ................. | B60K 6/40 |
| 12,214,666 B2 * | 2/2025 | Toda ........................ | F02B 53/04 |
| 2014/0345960 A1 * | 11/2014 | Yamanaka ............... | H05K 5/03 |
| | | | 180/68.5 |
| 2023/0311707 A1 * | 10/2023 | Lee ........................ | B60L 58/26 |
| | | | 220/501 |
| 2024/0229916 A1 * | 7/2024 | Oota ................... | F16H 57/0417 |
| 2025/0083514 A1 * | 3/2025 | Ipposhi ................. | B60K 11/04 |

FOREIGN PATENT DOCUMENTS

| | | |
|---|---|---|
| CN | 111817499 A1 | 10/2020 |
| JP | 2008-185078 A | 8/2008 |
| WO | WO-2020/067280 A1 | 4/2020 |

* cited by examiner

*Primary Examiner* — Jon T. Schermerhorn, Jr.
(74) *Attorney, Agent, or Firm* — Foley & Lardner LLP

(57) ABSTRACT

A unit includes a heat exchanger; a motor case configured to accommodate a motor; and an inverter case configured to accommodate an inverter, wherein the inverter case has a portion that overlaps the heat exchanger and the motor case when viewed in a predetermined direction.

12 Claims, 14 Drawing Sheets

MOTOR CASE COMBINATION UNIT

TECHNICAL FIELD

The present invention relates to a unit.

BACKGROUND ART

Patent Document 1 discloses a unit including a motor and a power transmission mechanism.

PRIOR ART DOCUMENT

Patent Document

Patent Document 1: JP 2008-185078 A

SUMMARY OF INVENTION

In a unit, oil is used to lubricate and cool rotating members. A heat exchanger for cooling the oil is mounted on the unit. The heat exchanger cools oil by exchanging heat between a liquid such as cooling water and oil.

It is required to provide a structure that contributes to a reduction in dimension of a unit on which a heat exchanger is mounted, at least in one direction.

According to one aspect of the present invention, a unit includes a heat exchanger; a motor case configured to accommodate a motor; and an inverter case configured to accommodate an inverter, wherein the inverter case has a portion that overlaps the heat exchanger and the motor case when viewed in a predetermined direction.

According to an aspect of the present invention, a reduction in dimension of a unit on which a heat exchanger is mounted can be achieved, at least in one direction.

DESCRIPTION OF EMBODIMENTS

Figure 1:
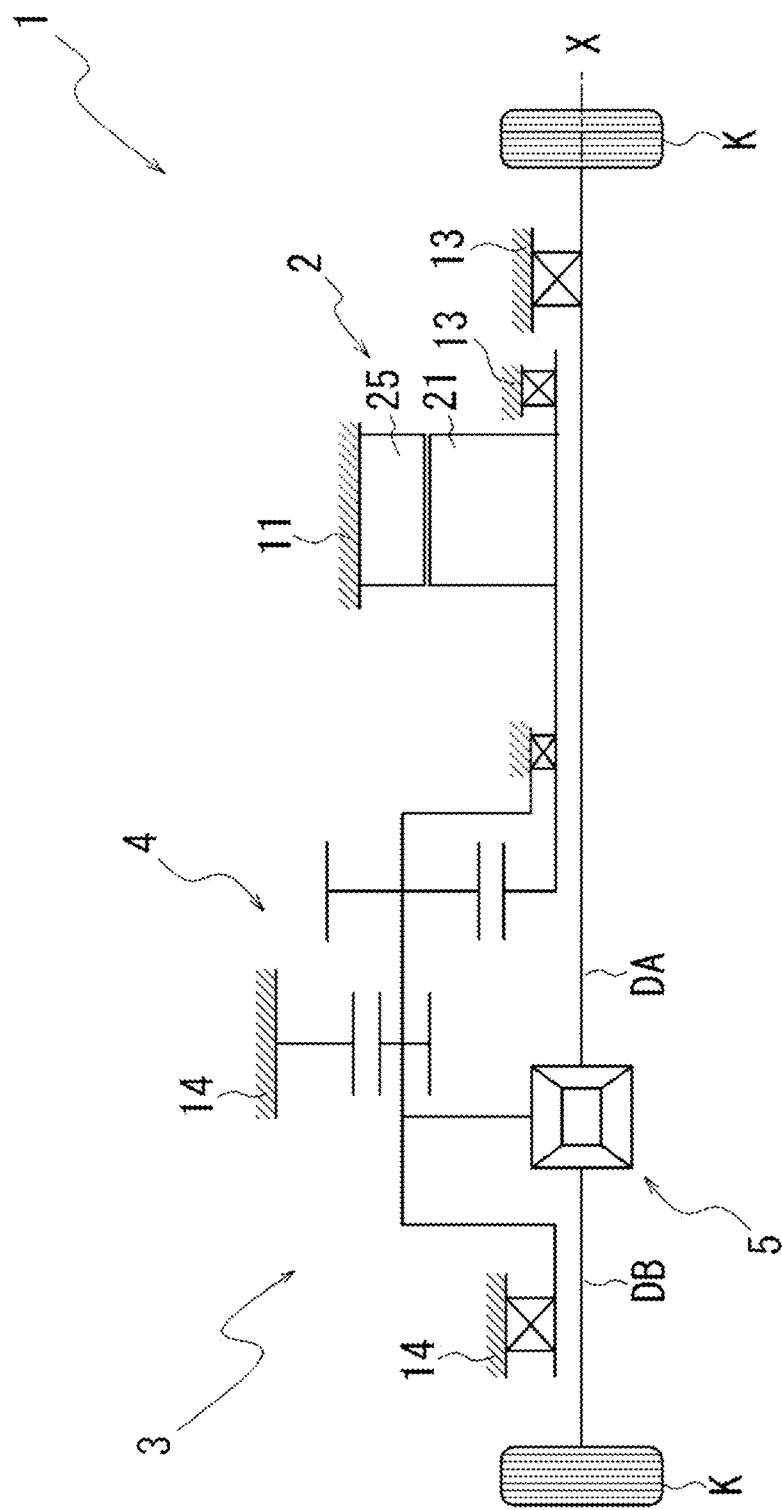
FIG. 1 is a skeleton diagram illustrating a unit mounted on a vehicle.

First, definitions of terms in the present description will be described.

A "unit" is also referred to as a "motor unit", a "power transmission device", or the like. The motor unit is a unit that includes at least a motor. The power transmission device is a device that includes at least a power transmission mechanism, and the power transmission mechanism is, for example, a gear mechanism and/or a differential gear mechanism. A unit that is a device including a motor and a power transmission mechanism belongs to concepts of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are disposed in a predetermined direction, in the description of the present description, it may be considered that there is a sentence explaining that the plurality of elements overlap when viewed in the predetermined direction.

The descriptions "do not overlap when viewed in a predetermined direction" and "offset when viewed in a predetermined direction" mean that a plurality of elements are not disposed in a predetermined direction, and have the same meaning as the descriptions "do not overlap in a predetermined direction" and "offset in a predetermined direction". The "predetermined direction" is, for example, an axial direction, a radial direction, a gravity direction, or a vehicle traveling direction (vehicle forward direction, vehicle backward direction).

When the drawing illustrates that a plurality of elements (components, portions, or the like) are not disposed in a predetermined direction, in the description of the present description, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is, for example, an axial direction, a radial direction, a gravity direction, or a vehicle running direction (vehicle forward direction, vehicle rearward direction).

For example, when the second element, the first element, and the third element are disposed in this order along the axial direction, it can be said that the first element is positioned between the second element and the third element when viewed in the radial direction. When the drawing illustrates that the first element is positioned between the second element and the third element when viewed in a predetermined direction, in the description of the present description, it may be considered that there is a sentence explaining that the first element is between the second element and the third element when viewed in the predetermined direction.

In a case in which two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. The component is, for example, a motor, a gear mechanism, or a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. Supplying the oil from an outside of the tank to the tank is expressed as "catch". The catch tank is provided, for example, using at least a part of the housing, or is provided separately from the housing. Integrally forming the catch tank and the housing contributes to a reduction in the number of components.

A "coolant" is a refrigerant and is a type of heat exchange medium. For example, the "coolant" is a liquid (cooling water or the like) or a gas (air or the like). The coolant is a concept that includes oil, but when both the oil and the coolant are described in the present description, it means that the coolant is made of a material different from that of the oil.

A "heat exchange unit" is an element (component, portion, or the like) that exchanges heat between two different heat exchange media (refrigerants). Combinations of the two heat exchange media are, for example, oil and cooling water, cooling water and air, or air and oil. The heat exchange unit includes, for example, a heat exchanger (oil cooler), a flow path through which a coolant flows, and a heat pipe. In the present invention, it is preferable to use a heat exchanger (oil cooler) as the heat exchange unit. Using the heat exchanger can contribute to improving heat exchange efficiency.

The heat exchanger (oil cooler) is a separate component from the housing. In the heat exchanger, for example, heat is exchanged between oil and cooling water.

A "vehicle room" means a room in a vehicle into which occupants enter.

Hereinafter, an embodiment of the present invention will be described.

FIG. 1 is a skeleton diagram illustrating a unit mounted on a vehicle.

Figure 2:
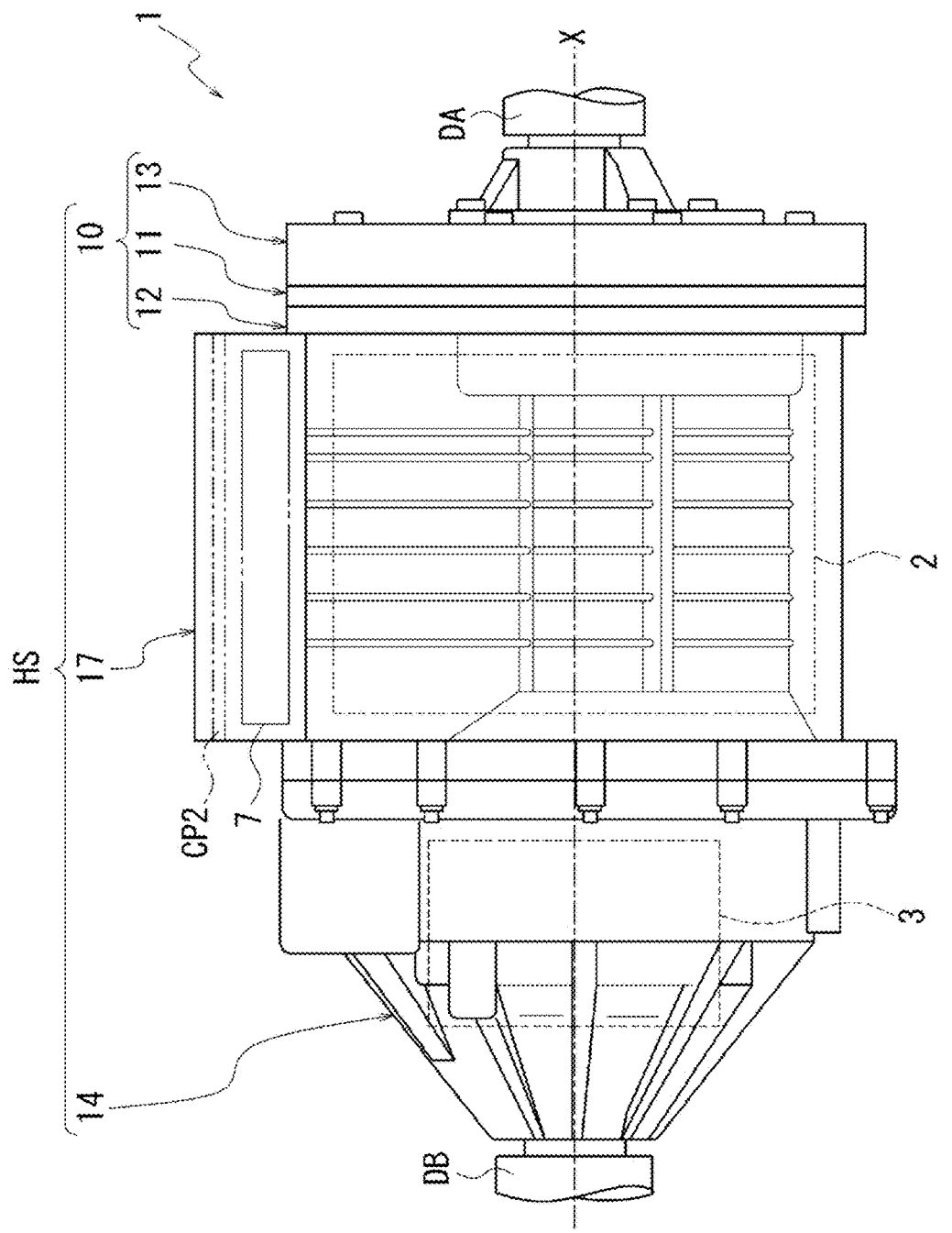
FIG. 2 is an external view of the unit.

FIG. 2 is an external view of the unit.

Figure 3:
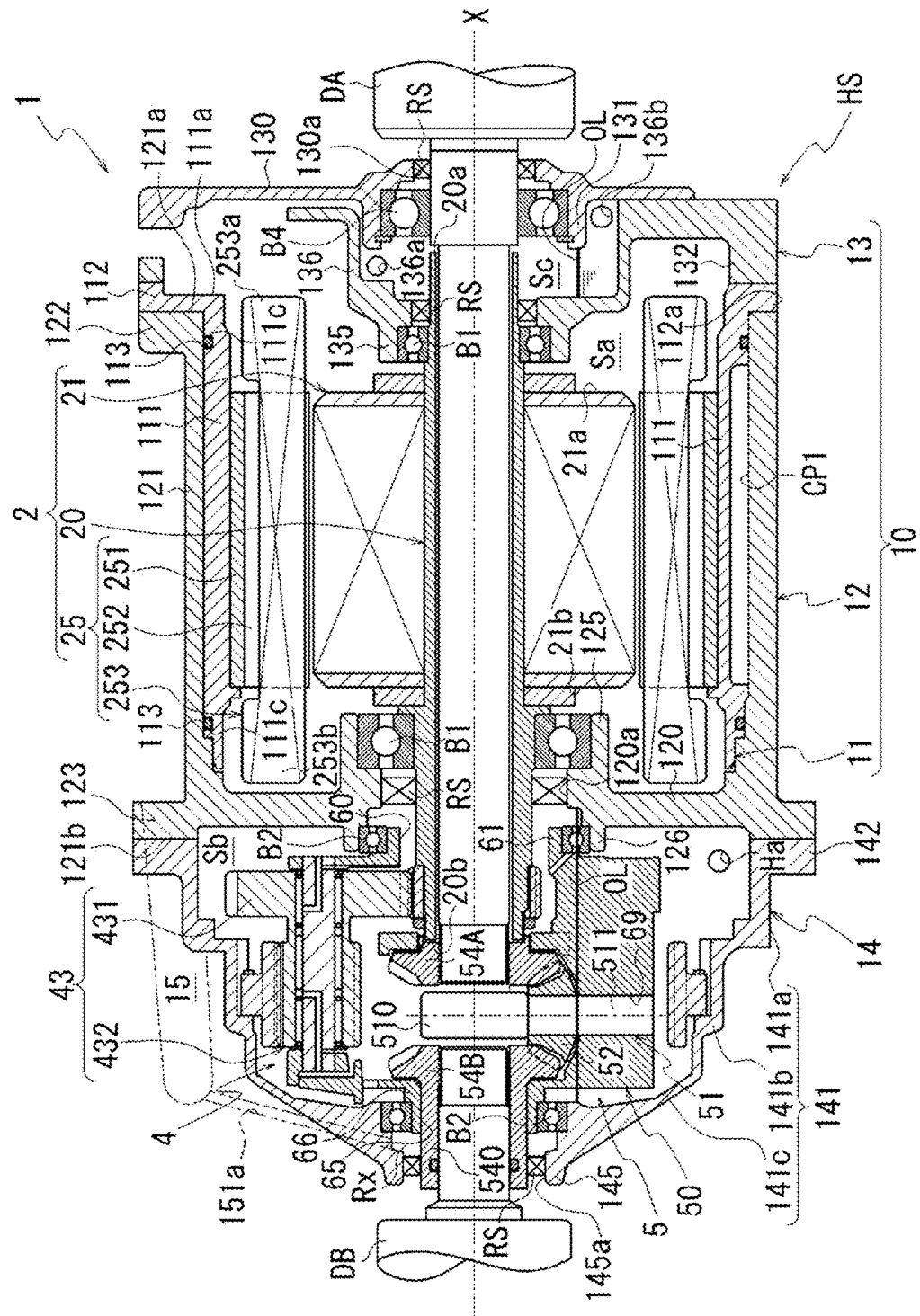
FIG. 3 is a schematic cross-sectional view of the unit.

FIG. 3 is a schematic cross-sectional view of the unit. FIG. 3 illustrates a state in which an inverter case is removed.

Figure 4:
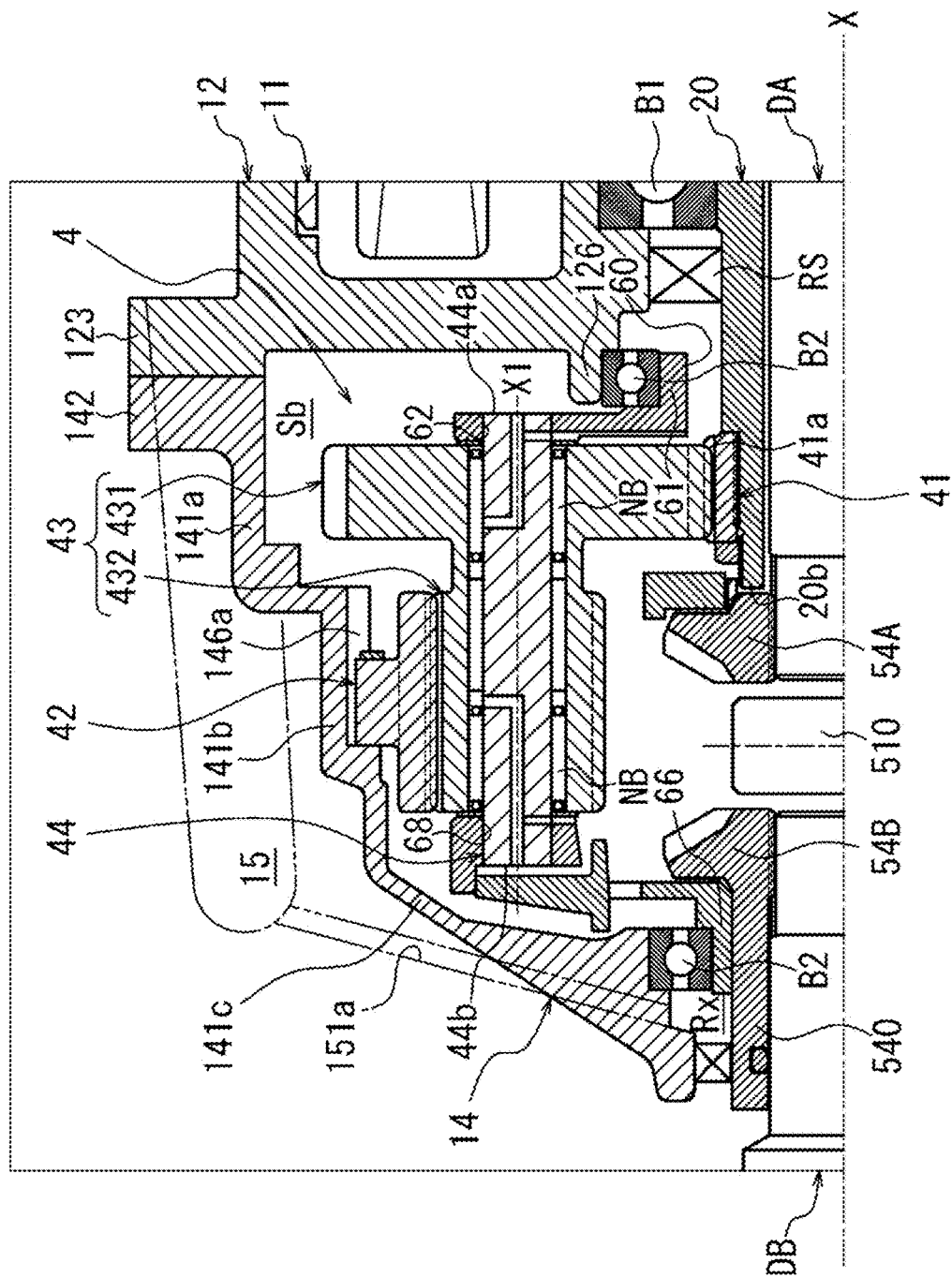
FIG. 4 is an enlarged view around a planetary reduction gear.

FIG. 4 is an enlarged view around a planetary reduction gear.

Figure 5:
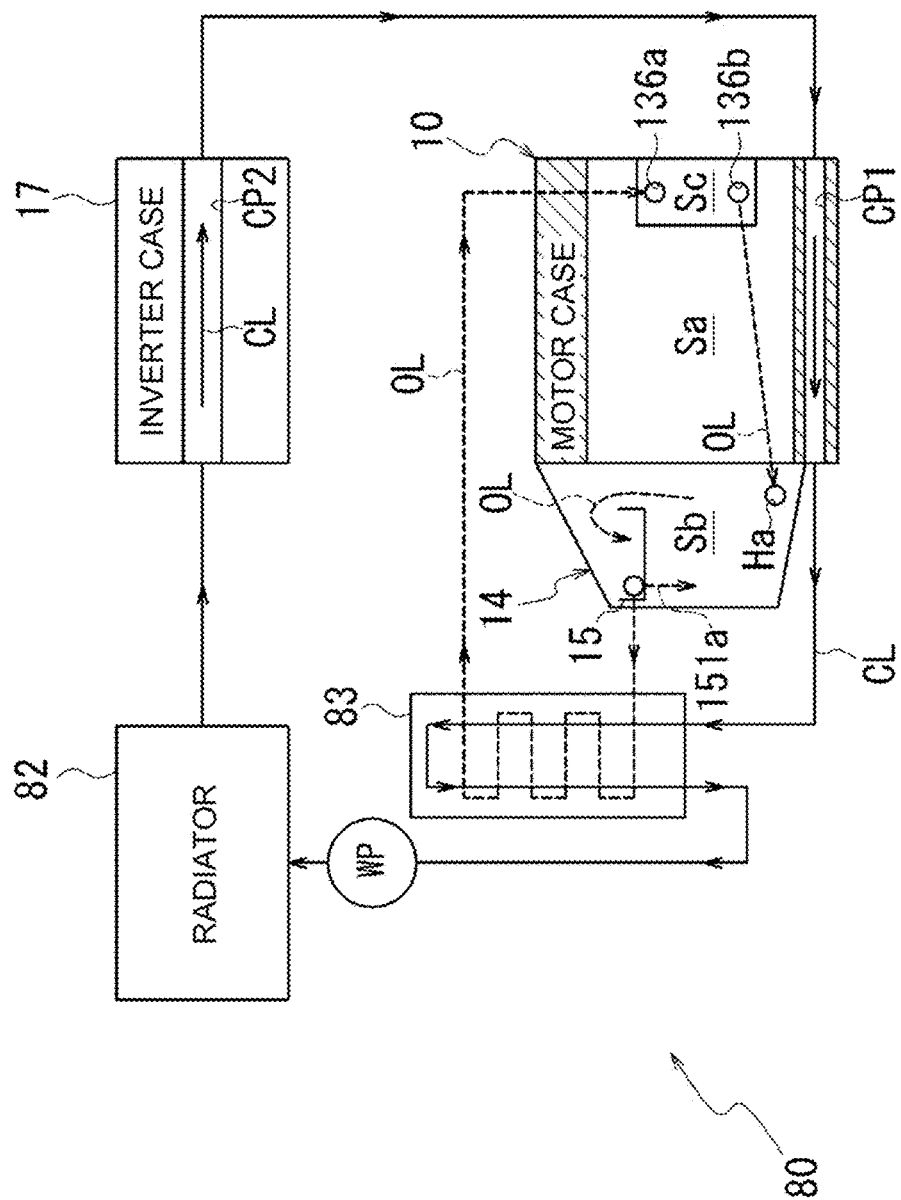
FIG. 5 is a diagram illustrating a flow of cooling water in the unit.

FIG. 5 is a diagram illustrating a circulation system of cooling water in the unit.

Figure 6:
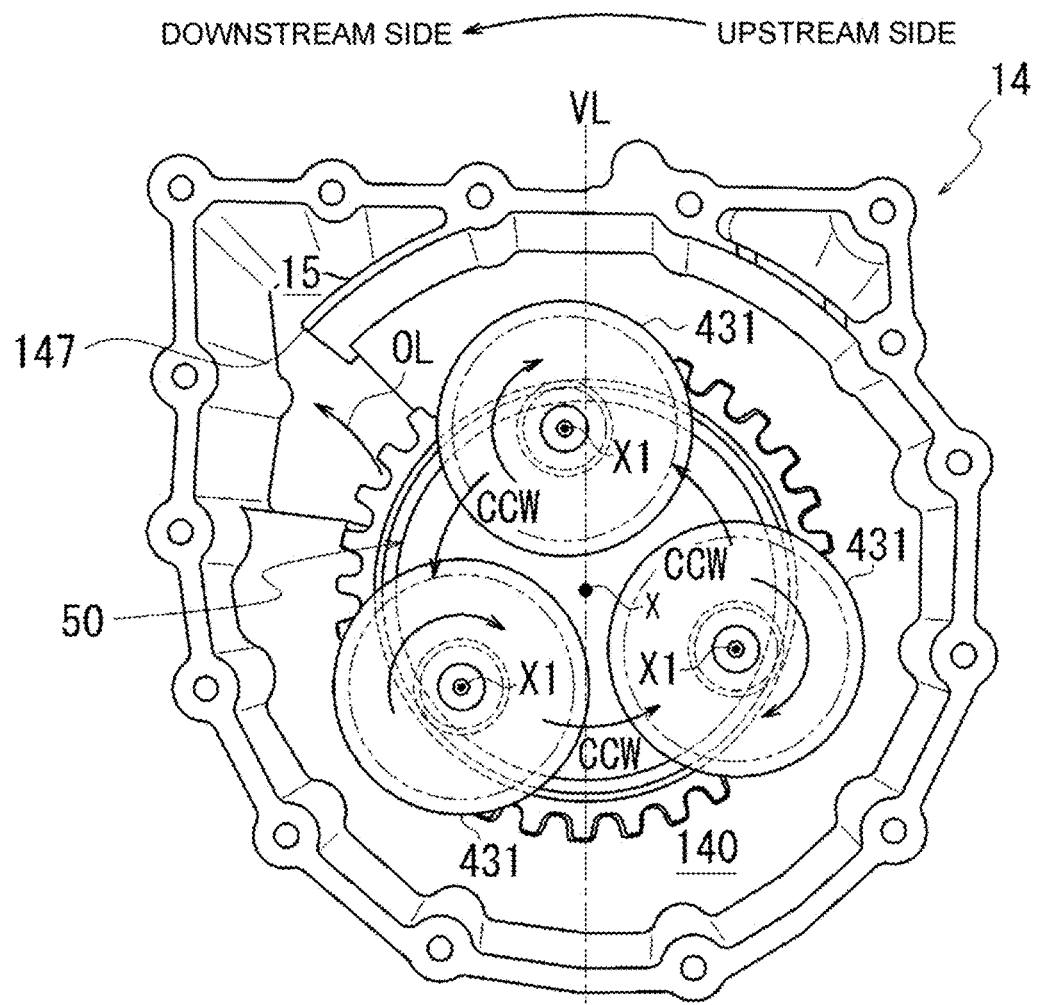
FIG. 6 is a diagram illustrating oil scraping up by a differential case.

FIG. 6 is a diagram illustrating a catch tank of a gear case.

As illustrated in FIG. 1, the unit 1 is a 3-in-1 unit, and includes a motor 2, a power transmission mechanism 3 that transmits power output from the motor 2 to drive wheels K, K of a vehicle, and an inverter 7 (see FIG. 2) that is a power conversion device of the motor 2.

In the embodiment, as illustrated in FIG. 1, the unit 1 includes, as the power transmission mechanism 3, a planetary reduction gear 4 (reduction gear mechanism, planetary gear mechanism), a differential mechanism 5 (differential gear mechanism), and drive shafts DA and DB as output shafts.

In the unit 1, the planetary reduction gear 4, the differential mechanism 5, and the drive shafts DA and DB are provided along a transmission path of output rotation around a rotation axis X of the motor 2. Axes of the drive shafts DA and DB are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K and K of the vehicle on which the unit 1 is mounted via the drive shafts DA and DB.

Here, the planetary reduction gear 4 is connected downstream of the motor 2. The differential mechanism 5 is connected downstream of the motor 2 via the planetary reduction gear 4. The drive shafts DA and DB are connected downstream of the differential mechanism 5.

As illustrated in FIG. 2, the unit 1 includes, as a 3-in-1 type housing, a housing HS that accommodates the motor 2, the power transmission mechanism 3 and the inverter 7. The housing HS includes one or more cases. The housing HS includes, for example, a motor case 10 that accommodates the motor 2, a gear case 14 that accommodates the power transmission mechanism 3, and an inverter case 17 that accommodates the inverter 7. The gear case 14 is joined to one end of the motor case 10 in a rotation axis X direction. The inverter case 17 is joined above the motor case 10 in a gravity direction in a state in which the unit 1 is mounted on the vehicle.

The inverter 7 is an electronic component including a smoothing capacitor, a power semi-conductor element, a driver board, and the like. The inverter 7 is electrically connected to the motor 2 inside the motor case 10 by wiring (not illustrated).

A cooling path CP2 through which cooling water CL (see FIG. 5) for cooling the inverter 7 flows is formed in the inverter case 17.

The motor 2 has a portion that overlaps the differential mechanism 5 (differential gear mechanism) when viewed in an axial direction (see FIG. 3). Here, "when viewed in an axial direction" means when viewed from the rotation axis X direction. "When viewed in a radial direction" means when viewed from the radial direction of the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As illustrated in FIG. 3, the motor case 10 includes a first case member 11, a second case member 12 fitted onto the first case member 11, and a cover member 13 joined to one end of the first case member 11. The first case member 11 includes a cylindrical support wall portion 111 and a flange-shaped joint portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled by fitting the peripheral wall portion 121 of the second case member 12 onto the support wall portion 111 of the first case member 11.

The joint portion 122 at the one end 121a of the peripheral wall portion 121 comes into contact with the joint portion 112 of the first case member 11 from the rotation axis X direction. The joint portions 122 and 112 are connected by bolts (not illustrated).

As illustrated in FIG. 3, the peripheral wall portion 121 of the second case member 12 is fitted onto the support wall portion 111 of the first case member 11. A clearance is provided between the peripheral wall portion 121 and the support wall portion 111 in a lower portion of the motor case 10. This clearance forms a cooling path CP1 through which the cooling water CL (see FIG. 5), which is a coolant, flows. The cooling path CP1 extends along the rotation axis X direction.

In an outer periphery of the support wall portion 111 of the first case member 11, ring grooves 111c and 111c are formed on both sides of a region in which the cooling path CP1 is provided. Seal rings 113 and 113 are fitted and attached to the ring grooves 111c and 111c.

The seal rings 113 are pressed against an inner periphery of the peripheral wall portion 121 fitted onto the support wall portion 111 to seal gaps between the outer periphery of the support wall portion 111 and the inner periphery of the peripheral wall portion 121.

A wall portion 120 (cover) extending radially inward is provided at the other end 121b of the second case member 12. The wall portion 120 is provided in a direction orthogonal to the rotation axis X. An opening 120a through which the drive shaft DA is inserted is opened in a region of the wall portion 120 intersecting the rotation axis X.

A tubular motor support portion 125 that surrounds the opening 120a and extends toward the motor 2 is provided on a surface of the wall portion 120 closer to the motor 2 (right side in the drawing).

The motor support portion 125 is inserted inside a coil end 253b, which will be described later. The motor support portion 125 faces an end portion 21b of a rotor core 21 with a gap therebetween in the rotation axis X direction. A bearing B1 is supported on an inner periphery of the motor support portion 125. An outer periphery of a motor shaft 20 is supported by the motor support portion 125 via the bearing B1.

A tubular wall portion 126 extending toward the differential mechanism 5 is provided on a surface of the wall portion 120 closer to the differential mechanism 5 (left side in the drawing). The tubular wall portion 126 has a tubular shape surrounding the opening 120a, and a bearing B2 is supported on an inner periphery of the tubular wall portion 126. The bearing B2 supports a tubular wall portion 61 of the differential case 50, which will be described later.

The cover member 13 includes a wall portion 130 orthogonal to the rotation axis X and a joint portion 132.

When viewed from the first case member 11, the cover member 13 is positioned on an opposite side (right side in the drawing) to the differential mechanism 5. The joint portion 132 of the cover member 13 is joined to the joint portion 112 of the first case member 11 from the rotation axis X direction. The cover member 13 and the first case member 11 are connected to each other with bolts (not illustrated). In this state, in the first case member 11, an opening of the support wall portion 111 closer to the joint portion 122 (right side in the drawing) is closed by the cover member 13.

In the cover member 13, an insertion hole 130a for the drive shaft DA is provided in a central portion of the wall portion 130.

A lip seal RS is provided on an inner periphery of the insertion hole 130a. A lip portion (not illustrated) of the lip seal RS comes into elastic contact with an outer periphery of the drive shaft DA. A gap between the inner periphery of the insertion hole 130a and the outer periphery of the drive shaft DA is sealed by the lip seal RS.

A peripheral wall portion 131 surrounding the insertion hole 130a is provided on a surface of the wall portion 130 closer to the first case member 11 (left side in the drawing). The drive shaft DA is supported on an inner periphery of the peripheral wall portion 131 via a bearing B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 closer to the wall portion 130 (right side in the drawing). The connection wall 136 is provided in a direction along the rotation axis X and extends away from the motor 2. The connection wall 136 connects the motor support portion 135 and the joint portion 132.

One end 20a of the motor shaft 20 penetrates an inner side of the motor support portion 135 from the motor 2 to the peripheral wall portion 131.

A bearing B1 is supported on an inner periphery of the motor support portion 135. The outer periphery of the motor shaft 20 is supported by the motor support portion 135 via the bearing B1.

A lip seal RS is provided at a position adjacent to the bearing B1.

Oil holes 136a and 136b are opened in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

The gear case 14 includes a peripheral wall portion 141 and a flange-shaped joint portion 142 provided at an end portion of the peripheral wall portion 141 closer to the motor case 10. A support portion 145 for bearings B2, which will be described later, is provided at an end portion of the peripheral wall portion 141 on a side (left side in the drawing) opposite to the joint portion 142. The peripheral wall portion 141 includes a tubular wall portion 141a connected to the joint portion 142, an inclined portion 141c (inclined surface) connected to the support portion 145, and a connection wall portion 141b connecting the tubular wall portion 141a and the inclined portion 141c. The tubular wall portion 141a and the connection wall portion 141b are gradually reduced in diameter from the joint portion 142 and connected to the inclined portion 141c. The inclined portion 141c is inclined radially inward from the connection wall portion 141b toward the support portion 145. The planetary reduction gear 4 and the differential mechanism 5, which are the power transmission mechanism 3, are accommodated inside the peripheral wall portion 141.

The gear case 14 is positioned closer to the differential mechanism 5 (left side in the drawing) when viewed from the motor case 10. The joint portion 142 of the gear case 14 is joined to the joint portion 123 of the second case member 12 of the motor case 10 from the rotation axis X direction. The gear case 14 and the second case member 12 are connected to each other with bolts (not illustrated).

A space formed inside the joined motor case 10 and gear case 14 is divided into two spaces by the wall portion 120 (cover) of the second case member 12. A side of the wall portion 120 in the motor case 10 is a motor chamber Sa that accommodates the motor 2, and a side of the wall portion 120 in the gear case 14 is a gear chamber Sb that accommodates the power transmission mechanism 3. The wall portion 120 as the cover is sandwiched between the motor 2 and the differential mechanism 5 inside the housing HS.

The cover may have a portion accommodated in the housing HS, or the entire cover may be accommodated in the housing HS like the wall portion 120. The cover may be, for example, separate from the second case member 12. In this case, the cover may be sandwiched and fixed between the motor case 10 and the gear case 14. A part of the cover may be exposed outside of the housing HS.

The motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearing B1 positioned on the one end 20a (right side in the drawing) of the motor shaft 20 when viewed from the rotor core 21 is supported on the inner periphery of the motor support portion 135 of the cover member 13. The bearing B1 positioned on the other end 20b (left side in the drawing) is supported on the inner periphery of the cylindrical motor support portion 125 of the second case member 12.

The motor support portions 135 and 125 are respectively disposed facing the one end portion 21a and the other end portion 21b of the rotor core 21, with a gap therebetween in the rotation axis X direction, on an inner diameter side of coil ends 253a and 253b, which will be described later.

The rotor core 21 is formed by laminating a plurality of silicon steel plates. Each of the silicon steel plates is fitted onto the motor shaft 20 such that relative rotation with respect to the motor shaft 20 is restricted.

When viewed from the rotation axis X direction of the motor shaft 20, the silicon steel plate has a ring shape. On an outer peripheral side of the silicon steel plate, N-pole and S-pole magnets (not illustrated) are alternately provided in a circumferential direction around the rotation axis X.

The stator core 25 surrounding the outer periphery of the rotor core 21 is formed by laminating a plurality of electromagnetic steel plates. The stator core 25 is fixed to an inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around a plurality of teeth portions 252 in a distributed manner is adopted. The stator core 25 is longer than the rotor core 21 in the rotation axis X direction by lengths of the coil ends 253a and 253b protruding in the rotation axis X direction.

A stator core in which windings are concentratedly wound around each of the plurality of teeth portions 252 protruding toward the rotor core 21 may be adopted.

The opening 120a is provided in the wall portion 120 (motor support portion 125) of the second case member 12. The other end 20b of the motor shaft 20 penetrates through the opening 120a to the differential mechanism 5 (left side in the drawing) and is positioned in the gear case 14.

The other end 20b of the motor shaft 20 faces a side gear 54A, which will be described later, inside the gear case 14 with a gap therebetween in the rotation axis X direction.

A lip seal RS is inserted between the motor shaft 20 and the opening 120a of the wall portion 120.

The oil OL for lubricating the planetary reduction gear 4 and the differential mechanism 5 is sealed on an inner diameter side of the gear case 14.

The lip seal RS is provided to prevent the oil OL in the gear case 14 from flowing into the motor case 10.

As illustrated in FIG. 4, a sun gear 41 of the planetary reduction gear 4 is spline-fitted in a region of the motor shaft 20 positioned in the gear case 14.

A teeth portion 41a is formed on an outer periphery of the sun gear 41, and a large-diameter gear portion 431 of a stepped pinion gear 43 meshes with the teeth portion 41a.

The stepped pinion gear 43 includes the large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

An outer periphery of the small-diameter gear portion 432 meshes with an inner periphery of a ring gear 42. The ring gear 42 has a ring shape surrounding the rotation axis X with a gap therebetween. On an outer periphery of the ring gear 42, engagement teeth are provided, and the engagement teeth are spline-fitted to a teeth portion 146a provided on an inner periphery of the connection wall portion 141b. The ring gear 42 is restricted from rotating around the rotation axis X.

A pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB and NB.

As illustrated in FIG. 3, the differential mechanism 5 includes the differential case 50 as an input element, the drive shafts DA and DB (output shafts) as output elements, and a differential gear set as a differential element. Although detailed description is omitted, the differential case 50 may be configured by two case members assembled in a rotation axis direction.

The differential case 50 also functions as a carrier that supports the stepped pinion gear 43 of the planetary reduction gear 4. The stepped pinion gear 43 is rotatably supported by the differential case 50 via the pinion shaft 44. As illustrated in FIG. 6, the three stepped pinion gears 43 are disposed at intervals in the circumferential direction around the rotation axis X.

As illustrated in FIG. 3, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and shaft members 511 connected to an outer diameter side of the central member 510. Although not illustrated, the plurality of shaft members 511 are provided at equal intervals in the circumferential direction around the rotation axis X. The shaft member 511 is inserted through a support hole 69 of the differential case 50 extending in the radial direction and supported.

The pinion mate gear 52 is fitted onto each of the shaft members 511 one by one and is rotatably supported.

In the differential case 50, the side gear 54A is positioned on one side of the central member 510 in the rotation axis X direction, and the side gear 54B is positioned on the other side of the central member 510. The side gears 54A and 54B are each rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and the tubular wall portion 61 surrounding the opening 60 and extending toward the motor case 10 are provided in a central portion of one end (right side in the drawing) of the differential case 50. An outer periphery of the tubular wall portion 61 is supported by the wall portion 120 of the second case member 12 via the bearing B2.

The drive shaft DA inserted through the opening 60 is inserted into the differential case 50 from the rotation axis X direction. The drive shaft DA penetrates the insertion hole 130a of the wall portion 130 of the cover member 13, and is provided across inner diameter sides of the motor shaft 20 of the motor 2 and the sun gear 41 of the planetary reduction gear 4 in the rotation axis X direction.

As illustrated in FIG. 3, a through hole 65 and a tubular wall portion 66 surrounding the through hole 65 are formed in a central portion on the other end side (left side in the drawing) of the differential case 50. A bearing B2 is fitted onto the tubular wall portion 66. The bearing B2 fitted onto the tubular wall portion 66 is held by the support portion 145 of the gear case 14. The tubular wall portion 66 of the differential case 50 is rotatably supported by the gear case 14 via the bearing B2.

The drive shaft DB penetrating an opening 145a of the gear case 14 is inserted into the support portion 145 from the rotation axis X direction. The drive shaft DB is rotatably supported by the support portion 145. The tubular wall portion 66 functions as a shaft support portion that supports an outer periphery of the drive shaft DB.

A lip seal RS is fixed to an inner periphery of the opening 145a. A lip portion (not illustrated) of the lip seal RS comes into elastic contact with an outer periphery of a tubular wall portion 540 of the side gear 54B fitted onto the drive shaft DB.

Accordingly, a gap between the outer periphery of the tubular wall portion 540 of the side gear 54B and the inner periphery of the opening 145a is sealed.

Inside the differential case 50, distal end portions of the drive shafts DA and DB face each other with a gap therebetween in the rotation axis X direction.

The side gears 54A and 54B supported by the differential case 50 are spline-fitted to outer peripheries of the distal end portions of the drive shafts DA and DB. The side gears 54A and 54B and the drive shafts DA and DB are coupled to each other so as to be integrally rotatable around the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 is assembled to the side gear 54A positioned on one side in the rotation axis X direction and the side gear 54B positioned on the other side in the rotation axis X direction such that teeth portions of the side gear 54A and the side gear 54B mesh with each other.

As illustrated in FIG. 4, a support hole 62 at one end 44a of the pinion shaft 44 is formed an outer diameter side of the opening 60 at the one end (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X according to a position where the stepped pinion gear 43 is disposed. The one end 44a of the pinion shaft 44 is inserted into the support hole 62, and the other end 44b is inserted into the support hole 68.

The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported around the axis X1 parallel to the rotation axis X.

Although not shown, the oil OL for lubrication is stored inside the gear case 14. When the differential case 50 rotates around the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. Accordingly, the oil OL is easily introduced into rotating members such as the bearing B2 and the needle bearing NB.

As illustrated in FIG. 6, a catch tank 15 is provided above the differential case 50 in the gear case 14. The catch tank 15 is positioned on one side (left side in the drawing) of a vertical line VL orthogonal to the rotation axis X. The catch tank 15 and an accommodation portion 140 of the differential case 50 communicate with each other via a communication port 147. A part of the oil OL scraped up by the differential case 50 and scattered flows into the catch tank 15 from the communication port 147 and is collected.

When the vehicle equipped with the unit 1 travels forward, the differential case 50 rotates in a counterclockwise direction CCW around the rotation axis X when viewed from the motor case 10. As illustrated in FIG. 4, the small-diameter gear portion 432 of the stepped pinion gear 43 meshes with the ring gear 42 fixed to an inner periphery of the gear case 14. Therefore, as illustrated in FIG. 6, the large-diameter gear portion 431 of the stepped pinion gear 43 revolves around the rotation axis X in the counterclockwise direction CCW while rotating clockwise around the axis X1.

The catch tank 15 is positioned on the left side of the vertical line VL, that is, on a downstream side in a rotation direction of the differential case 50. Accordingly, most of the oil OL scraped up by the differential case 50 rotating around the rotation axis X can flow into the catch tank 15.

As illustrated in FIG. 3, the catch tank 15 is connected to a space Rx between the lip seal RS and the bearing B2 via an oil passage 151a. The catch tank 15 is connected to an oil cooler 83 (see FIG. 5) via an oil passage, a pipe, and the like (not illustrated). The oil cooler 83 is connected to the oil hole 136a (see FIG. 3) formed in the connection wall 136 via a pipe, an oil passage, or the like (not illustrated).

An oil hole Ha is formed in the peripheral wall portion 141 of the gear case 14. The oil hole Ha is connected to the oil hole 136b formed in the internal space Sc via a pipe (not illustrated). The oil OL discharged from the internal space Sc through the oil hole 136b is supplied again into the gear chamber Sb through the oil hole Ha.

As illustrated in FIG. 5, the unit 1 is provided with a circulation system 80 for the cooling water CL. The circulation system 80 circulates the cooling water CL between the cooling path CP1 in the motor case 10 and the cooling path CP2 in the inverter case 17. The circulation system 80 further includes the oil cooler 83, a water pump WP, and a radiator 82 between the cooling path CP1 and the cooling path CP2, which are connected by pipes or the like through which the cooling water CL flows.

The water pump WP pumps the cooling water CL in the circulation system 80.

The radiator 82 is a device that dissipates heat of the cooling water CL to cool the cooling water CL.

The oil cooler 83 is a heat exchanger that exchanges heat between the cooling water CL and the oil OL. The oil OL collected by the catch tank 15 provided in the gear chamber Sb of the gear case 14 is introduced into the oil cooler 83. The oil OL is cooled by heat exchange with the cooling water CL. The cooled oil OL is supplied from the oil hole 136a of the motor case 10 to the internal space Sc. The oil OL supplied to the oil cooler 83 is not limited to the oil OL collected by the catch tank 15, and may be supplied from another oil passage appropriately provided in the housing HS. The oil OL discharged from the oil cooler 83 may be supplied to a location other than the internal space Sc.

The cooling water CL is supplied to the oil cooler 83 after flowing through the cooling path CP2 in the inverter case 17 and the cooling path CP1 in the motor case 10. After the heat exchange with the oil OL in the oil cooler 83, the cooling water CL is cooled by the radiator 82 and supplied to the cooling path CP2 of the inverter case 17 again.

Figure 7:
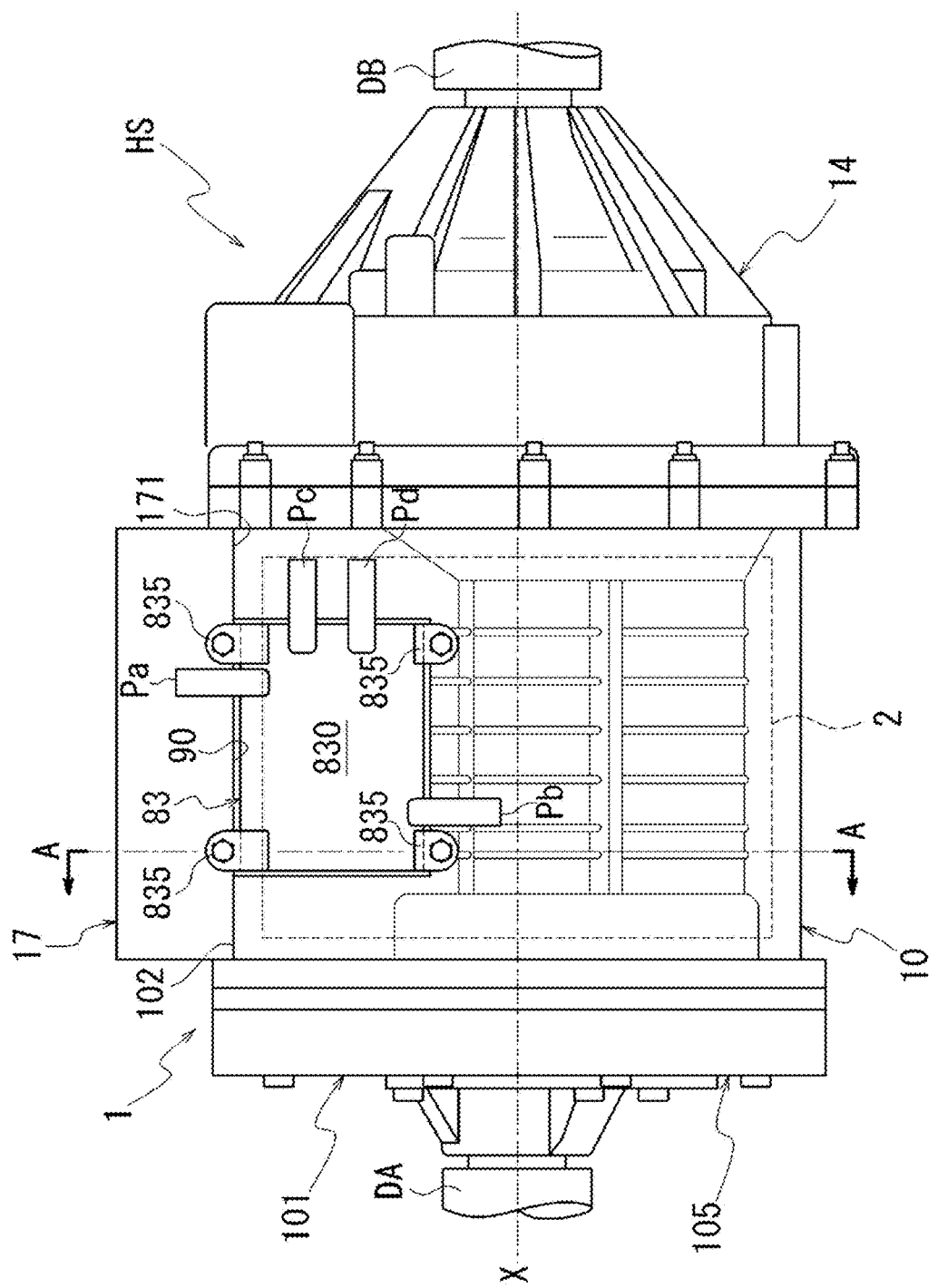
FIG. 7 is a view illustrating an oil cooler attached to a housing.

FIG. 7 is a view illustrating the oil cooler 83 attached to the housing HS. FIG. 7 is a schematic view illustrating a state viewed from a back side of the drawing sheet of FIG. 2.

Figure 8:
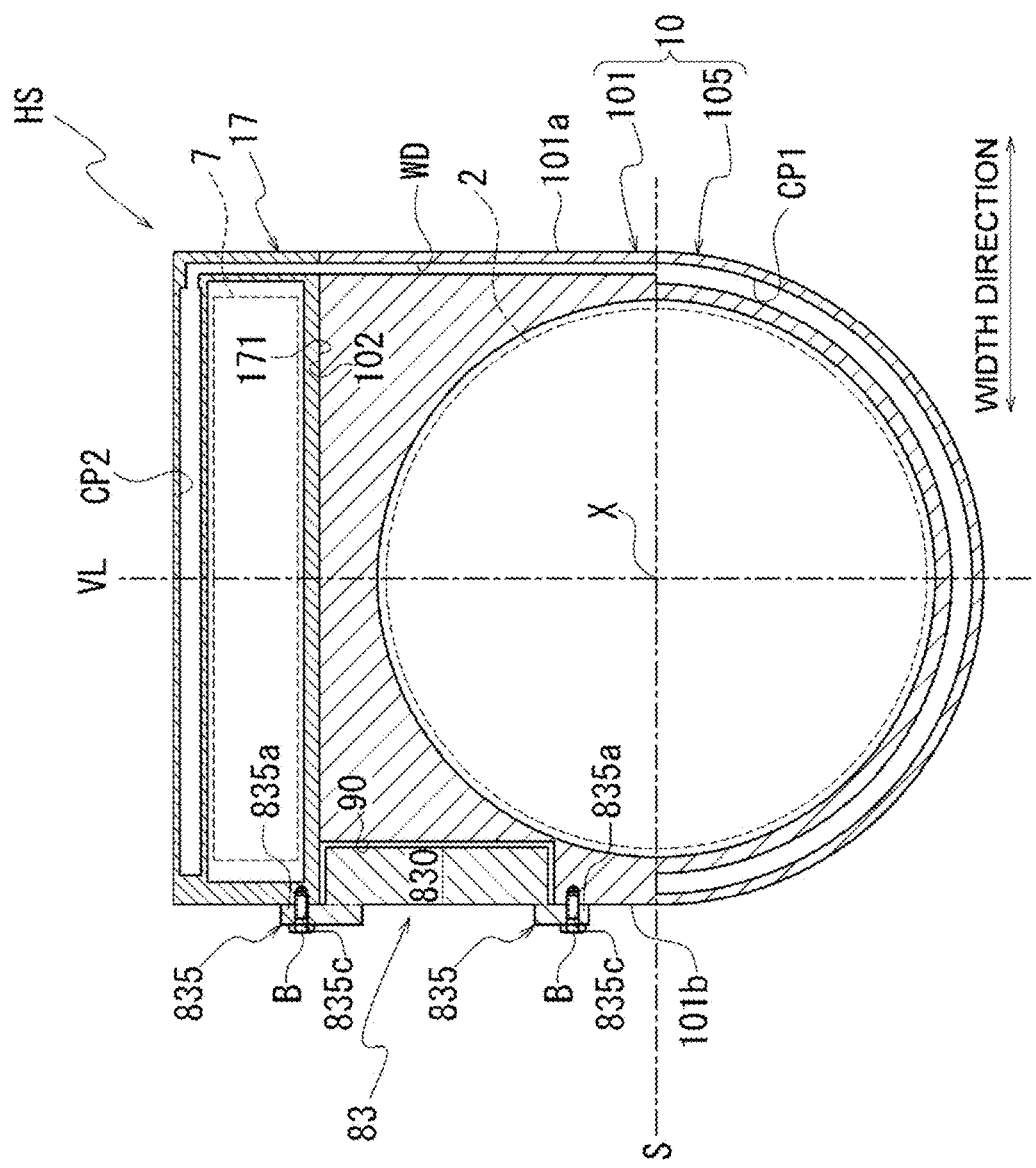
FIG. 8 is a schematic cross-sectional view taken along line A-A in FIG. 7.

FIG. 8 is a schematic view taken along line A-A in FIG. 7. In FIG. 8, the insides of the motor case 10 and the inverter case 17 are simplified, and the outer peripheries of the motor 2 and the inverter 7 are indicated by broken lines. An interior of a main body portion 830 of the oil cooler 83 is not illustrated.

Figure 9:
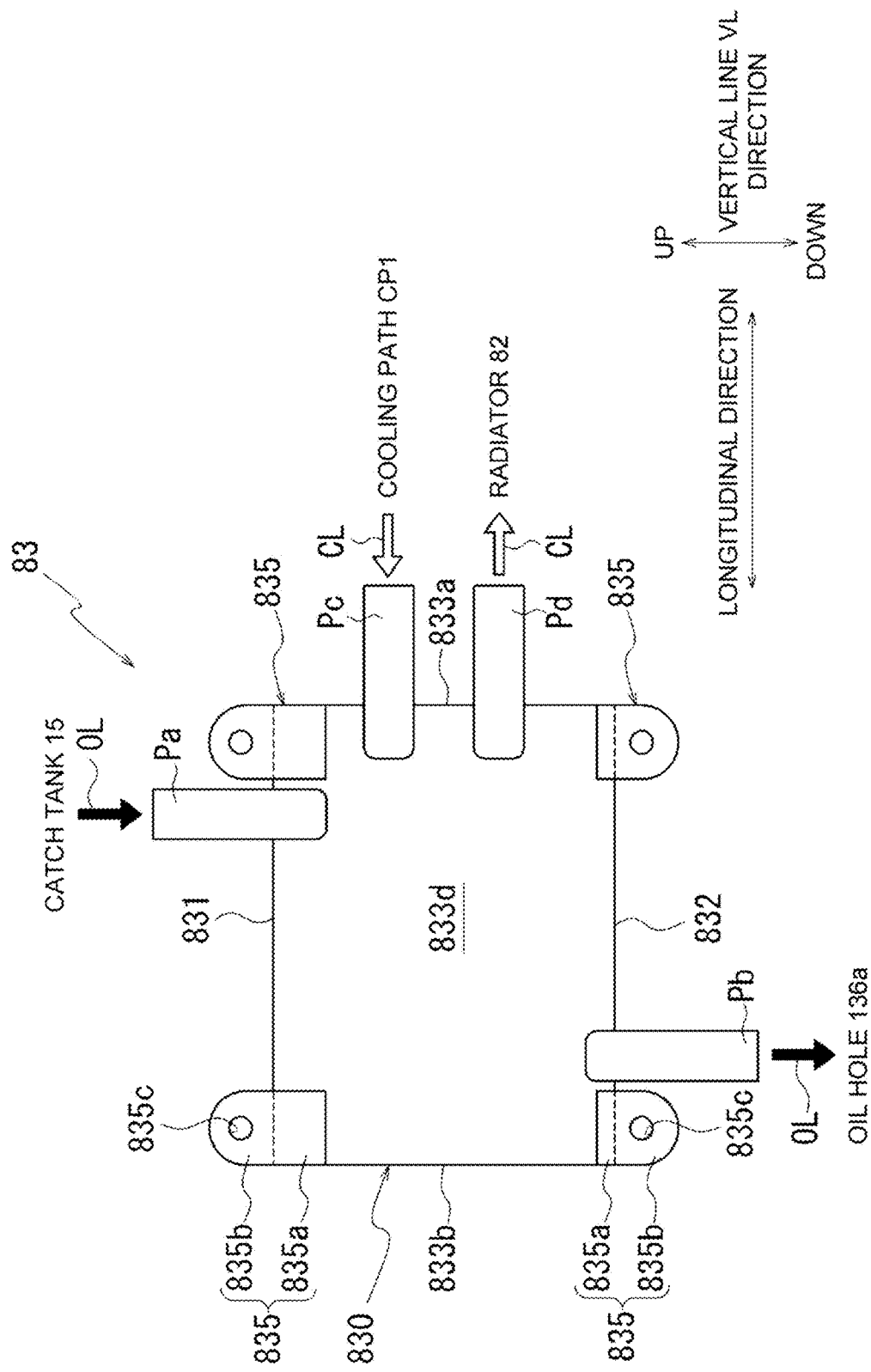
FIG. 9 is a diagram illustrating a configuration of the oil cooler.

FIG. 9 is a diagram illustrating a configuration of the oil cooler 83.

Figure 10:
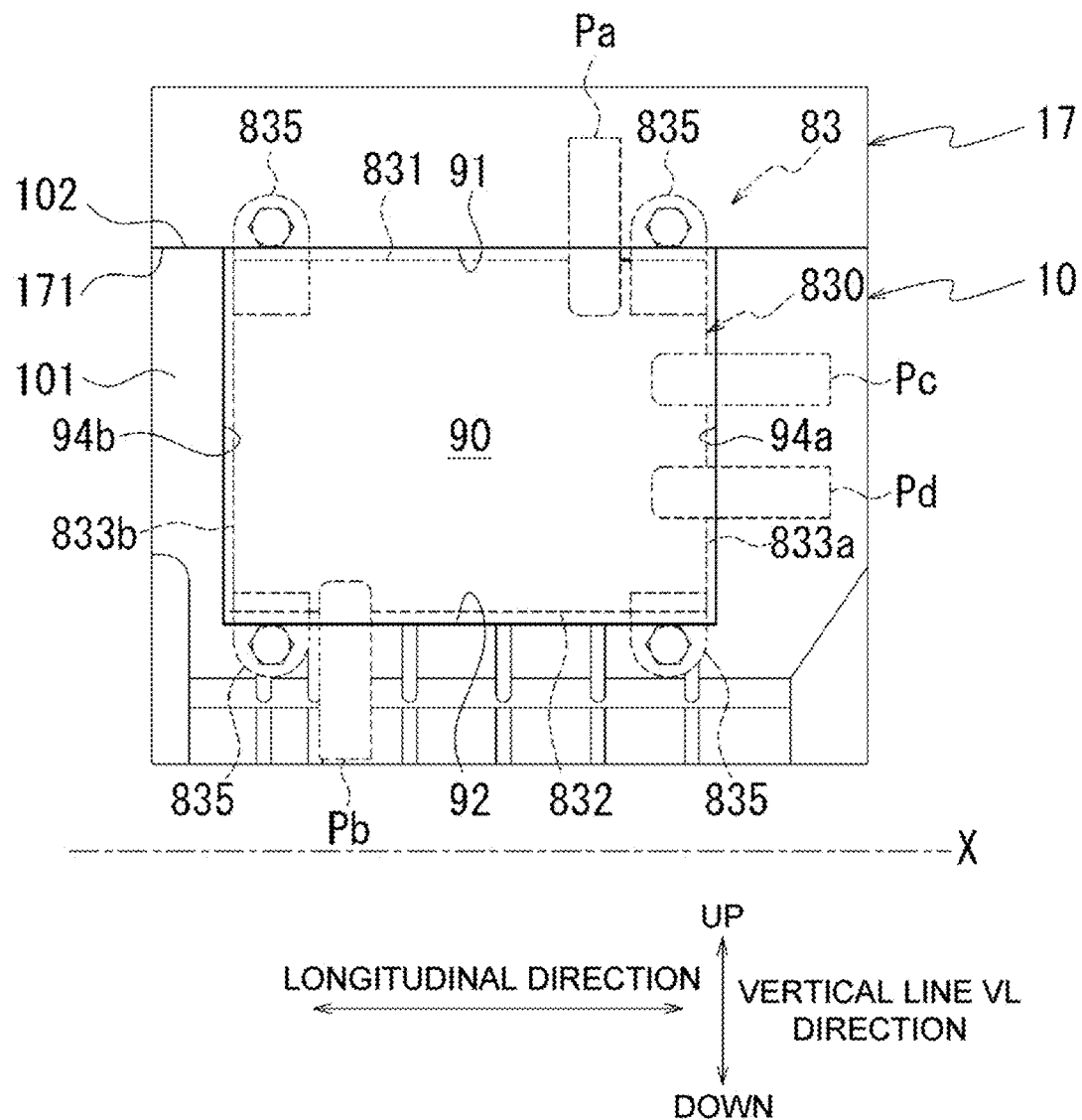
FIG. 10 is an enlarged view around the oil cooler in FIG. 7.

FIG. 10 is an enlarged view around the oil cooler 83 in FIG. 7. In FIG. 10, the oil cooler 83 is indicated by a broken line in order to facilitate understanding of a recess 90.

Figure 11:
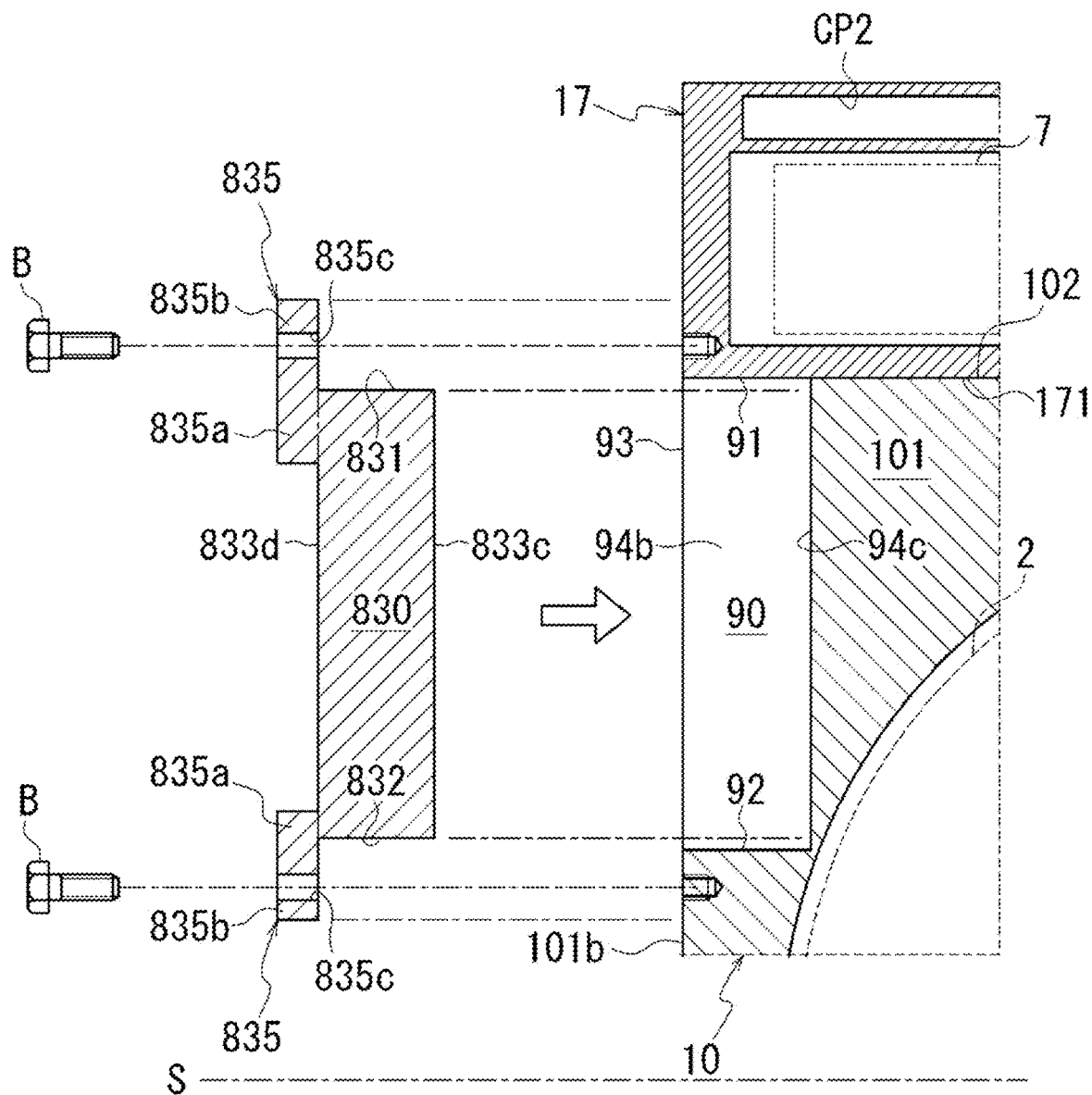
FIG. 11 is an enlarged view illustrating an assembly of the oil cooler.

FIG. 11 is a view illustrating an assembly of the oil cooler 83.

As illustrated in FIG. 7, the oil cooler 83 (heat exchanger) is disposed on an outer wall surface of the motor case 10 of the housing HS. In the following description, a direction along the rotation axis X of the housing HS (left-right direction of the drawing sheet of FIG. 7) is referred to as a longitudinal direction. A direction orthogonal to the longitudinal direction and the vertical line VL (left-right direction of the drawing sheet of FIG. 8) is referred to as a width direction.

The motor 2 has a columnar shape, and as illustrated in FIG. 8, has a circular shape when viewed in the rotation axis X direction. FIG. 8 illustrates a horizontal plane S that passes through the rotation axis X that is an axial center of the motor 2 and is orthogonal to the vertical line VL. The motor case 10 that accommodates the motor 2 includes an upper portion 101, which is a portion above the horizontal plane S, and a lower portion 105, which is a portion below the horizontal surface S. The upper portion 101 surrounds the outer periphery of the motor 2 above the horizontal plane S, and the lower portion 105 surrounds the outer periphery of the motor 2 below the horizontal plane S.

The lower portion 105 of the motor case 10 forms an arc along the outer periphery of the circular motor 2 when viewed in the rotation axis X direction. The cooling path CP1 through which the cooling water CL flows is formed in the lower portion 105.

The upper portion 101 of the motor case 10 has a rectangular shape when viewed in the rotation axis X direction. As illustrated in FIG. 7, a lower end surface 171 of the rectangular parallelepiped-shaped inverter case 17 is joined to an upper end surface 102 of the upper portion 101.

That is, the upper portion 101 of the motor case 10 functions as a connection portion with the inverter case 17.

As illustrated in FIG. 8, a communication passage WD that communicates the cooling path CP2 provided in the inverter case 17 with the cooling path CP1 provided in the lower portion 105 of the motor case 10 is provided on one end 101a side (right side in the drawing) of the upper portion 101 of the motor case 10 in the width direction.

The recess 90, which is an accommodation portion for the oil cooler 83, is provided on the other end 101b side (left side in the drawing) of the upper portion 101 in the width direction.

As illustrated in FIG. 9, the oil cooler 83 includes a rectangular parallelepiped-shaped main body portion 830. The main body portion 830 includes an upper surface portion 831 and a bottom surface portion 832 which are provided in parallel with each other with a gap therebetween. As illustrated in FIG. 9 and FIG. 11, in the rectangular parallelepiped-shaped main body portion 830, the upper surface portion 831 and the bottom surface portion 832 are connected to four side surface portions 833a to 833d.

As illustrated in FIG. 9, the side surface portion 833a is positioned at one end (right side in the drawing) of the main body portion 830 in the longitudinal direction, and the side surface portion 833b is positioned on the other end (left side in the drawing) of the main body portion 830. As illustrated in FIG. 11, the side surface portion 833c is positioned at one end (right side in the drawing) of the main body portion 830 in the width direction, and the side surface portion 833d is positioned at the other end (left side in the drawing) of the main body portion 830.

Although not illustrated, a flow path of the oil OL and a flow path of the cooling water CL are provided in an internal space of the main body portion 830 surrounded by the upper surface portion 831, the bottom surface portion 832, and the side surface portions 833a to 833d. In the main body portion 830, the oil OL and the cooling water CL flow through the respective flow paths, thereby performing heat exchange.

The side surface portion 833d is provided with a pipe Pa for introducing the oil OL into the main body portion 830 and a pipe Pb for discharging the oil OL from the main body portion 830. The side surface portion 833d is also provided with a pipe Pc for introducing the cooling water CL into the main body portion 830 and a pipe Pd for discharging the cooling water CL from the main body portion 830.

The pipes Pa, Pb, Pc, and Pd protrude from the side surface portion 833d. Positions at which the pipes Pa, Pb, Pc, and Pd are provided are not limited to the illustrated examples, and the pipes Pa, Pb, Pc, and Pd can be appropriately disposed on the side surface portion 833d according to disposition of the flow paths formed inside the main body portion 830 or the like.

Plate-shaped tabs 835 are provided at an upper end and a lower end of the side surface portion 833d. The tab 835 includes a joint portion 835a joined to the side surface portion 833d and a tip portion 835b connected to the joint portion 835a. The tip portion 835b extends in the vertical line direction from the joint portion 835a and protrudes outward from the side surface portion 833d.

The tab 835 provided at the upper end of the side surface portion 833d protrudes upward in the vertical line VL direction of the side surface portion 833d. The tab 835 provided at the lower end portion of the side surface portion 833d protrudes downward in the vertical line VL direction of the side surface portion 833d. A bolt insertion hole 835c is formed in the tip portion 835b of the tab 835. The tabs 835 are provided at both ends of the upper end and the lower end of the side surface portion 833d in the longitudinal direction. Four tabs 835 are provided on the side surface portion 833d.

As illustrated in FIG. 8, the recess 90 provided in the upper portion 101 of the motor case 10 accommodates the main body portion 830 of the oil cooler 83. The recess 90 has a shape matching the rectangular parallelepiped-shaped main body portion 830. The recess 90 is provided by cutting out an outer wall of the upper portion 101 from the end portion 101b side (left side in the drawing) toward the end portion 101a side (right side in the drawing) in the width direction. In the vertical line VL direction, the recess 90 extends from a position near the horizontal plane S of the upper portion 101 to the upper end surface 102 joined to the lower end surface 171 of the inverter case 17. Therefore, as illustrated in FIG. 10, among the surfaces forming the recess 90, an upper wall surface 91 is formed by the lower end surface 171 of the inverter case 17. A bottom wall surface 92 of the recess 90 is provided in parallel to the upper wall surface 91 with a gap therebetween.

As illustrated in FIG. 10 and FIG. 11, the recess 90 has three side wall surfaces 94a, 94b, and 94c that connect the upper wall surface 91 and the bottom wall surface 92. As illustrated in FIG. 10, the side wall surface 94a is positioned at one end of the recess 90 in the longitudinal direction, and the side wall surface 94b is positioned at the other end of the recess 90. As illustrated in FIG. 11, the side wall surface 94c is positioned at one end (right side in the drawing) of the recess 90 in the width direction. An opening 93 is provided at one end (left side in the drawing) of the recess 90 in the longitudinal direction. The main body portion 830 of the oil cooler 83 is accommodated in the recess 90 through the opening 93.

As illustrated in FIG. 11, the main body portion 830 of the oil cooler 83 accommodated in the recess 90 is disposed such that the longitudinal direction thereof extends along the longitudinal direction of the motor case 10 and the inverter case 17. The bottom surface portion 832 of the main body portion 830 faces the bottom wall surface 92 of the recess 90. That is, the oil cooler 83 is disposed between the motor case 10 and the inverter case 17.

As illustrated in FIG. 11, the side surface portion 833c of the main body portion 830 faces the side surface 94c of the recess 90. The side surface portion 833d of the main body portion 830 is positioned in the opening 93 of the recess 90. That is, the main body portion 830 is accommodated in the recess 90 with the side surface portion 833d facing an outside of the motor case 10.

As illustrated in FIG. 7, the pipes Pa, Pb, Pc, and Pd and the tab 835 protruding from the side surface portion 833d protrude from the opening 93 to the outside of the motor case 10.

As illustrated in FIG. 11, the tip portion 835b of the tab 835 provided at the upper end portion of the main body portion 830 extends upward in the vertical line VL direction of the opening 93 and faces an outer wall of the inverter case 17. As illustrated in FIG. 11, the tab 835 is fixed to the inverter case 17 by screwing a bolt B inserted through the insertion hole 835c of the tip portion 835b into the outer wall of the inverter case 17.

The tip portion 835b of the tab 835 provided at the lower end portion of the main body portion 830 extends downward in the vertical line VL direction of the opening 93 and faces an outer wall of the motor case 10. The tab 835 is fixed to the motor case 10 by screwing a bolt B inserted through the insertion hole 835c of the tip portion 835b into the outer wall of the motor case 10.

The main body portion 830 of the oil cooler 83 has an upper side fixed to the inverter case 17 and a lower side fixed to the motor case 10 via the tabs 835. The tab 835 functions as a seating surface when the oil cooler 83 is attached to the inverter case 17 and the motor case 10 by bolts B (fasteners).

The pipe Pa is connected to the catch tank 15 (see FIG. 3) provided in the gear case 14 via a pipe, an oil passage, or the like (not illustrated). The pipe Pb is connected to the oil hole 136*a* (see FIG. 3) of the connection wall 136 via a pipe, an oil passage, or the like (not illustrated). The pipe Pc is connected to the cooling path CP1 in the motor case 10 via a pipe, an oil passage, or the like (not illustrated). The pipe Pd is connected to the radiator 82 (see FIG. 5) via a pipe (not illustrated) or the like.

Functions of the unit 1 having such a configuration will be described.

As illustrated in FIG. 1, in the unit 1, the planetary reduction gear 4, the differential mechanism 5, and the drive shafts DA and DB are provided along the transmission path of the output rotation of the motor 2.

As illustrated in FIG. 3, when the motor 2 is driven and the rotor core 21 rotates around the rotation axis X, the rotation is input to the sun gear 41 of the planetary reduction gear 4 via the motor shaft 20 that rotates integrally with the rotor core 21.

In the planetary reduction gear 4, the sun gear 41 serves as an input portion for the output rotation of the motor 2, and the differential case 50 supporting the stepped pinion gear 43 serves as an output portion for the input rotation.

As illustrated in FIG. 4, when the sun gear 41 rotates around the rotation axis X by the input rotation, the stepped pinion gear 43 (large-diameter gear portion 431 and small-diameter gear portion 432) rotates around the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating around the axis X1.

Here, in the stepped pinion gear 43, an outer diameter of the small-diameter gear portion 432 is smaller than an outer diameter of the large-diameter gear portion 431.

Accordingly, the differential case 50 supporting the stepped pinion gear 43 rotates around the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As illustrated in FIG. 3, when the differential case 50 rotates around the rotation axis X by the input rotation, the drive shafts DA and DB meshing with the pinion mate gear 52 rotate around the rotation axis X in the differential case 50. Accordingly, left and right drive wheels (not illustrated) of the vehicle on which the unit 1 is mounted are rotated by the transmitted rotational driving force.

The oil OL for lubrication is stored inside the gear chamber Sb. In the gear chamber Sb, when the output rotation of the motor 2 is transmitted, the oil OL is scraped up by the differential case 50 rotating around the rotation axis X.

As illustrated in FIG. 3 and FIG. 4, the scraped-up oil OL lubricates a meshing portion between the sun gear 41 and the large-diameter gear portion 431, a meshing portion between the small-diameter gear portion 432 and the ring gear 42, and meshing portions between the pinion mate gear 52 and the side gears 54A and 54B.

As illustrated in FIG. 6, the differential case 50 rotates around the rotation axis X in the counterclockwise direction CCW.

The catch tank 15 is provided on an upper portion of the gear case 14. The catch tank 15 is positioned on the downstream side in the rotation direction of the differential case 50, and a part of the oil OL scraped up by the differential case 50 flows into the catch tank 15.

As illustrated in FIG. 3, a part of the oil OL flowing into the catch tank 15 is supplied to the space Rx between the lip seal RS and the bearing B2 via the oil passage 151*a* to lubricate the bearing B2.

A part of the oil OL flowing into the catch tank 15 is introduced from the pipe Pa of the oil cooler 83 to the main body portion 830 (see FIG. 9) via an oil passage, a pipe, or the like (not illustrated). The cooling water CL after flowing through the cooling path CP1 (see FIG. 5) is introduced into the main body portion 830 of the oil cooler 83 via the pipe Pc. In the main body portion 830 of the oil cooler 83, the oil OL is cooled by heat exchange between the oil OL and the cooling water CL. The cooled oil OL is discharged from the main body portion 830 via the pipe Pb. The cooling water CL is discharged from the main body portion 830 via the pipe Pd, and is supplied to the radiator 82 (see FIG. 5) via a pipe or the like (not illustrated).

The oil OL discharged from the main body portion 830 is supplied to the internal space Sc (see FIG. 3) through the oil hole 136*a* formed in the connection wall 136 via a pipe or the like (not illustrated). The oil OL supplied to the internal space Sc lubricates the bearing B4 and is discharged from the oil hole 136*b*. The oil OL discharged from the oil hole 136*b* is supplied into the gear chamber Sb from the oil hole Ha via a pipe or the like (not illustrated).

As described above, the unit 1 in the embodiment is a 3-in-1 unit. As illustrated in FIG. 7, in the housing HS, the inverter case 17 is joined to the motor case 10 and is integrally formed. The inverter case 17 overlaps the motor case 10 when viewed in the radial direction of the rotation axis X.

As illustrated in FIG. 8, the upper portion 101 of the motor case 10, which is joined to the rectangular parallelepiped-shaped inverter case 17, has a rectangular shape when viewed in the rotation axis X direction. On the other hand, the motor 2 accommodated in the motor case 10 has a circular shape when viewed in the rotation axis X direction. Therefore, a clearance is generated between the outer wall of the upper portion 101 and the outer periphery of the motor 2. In the embodiment, the recess 90 for accommodating the oil cooler 83 is provided in the clearance portion.

In a state in which the oil cooler 83 is accommodated in the recess 90, the inverter case 17 overlaps the oil cooler 83 and the motor case 10 when viewed in the vertical line VL direction (gravity direction). Since the recess 90 is formed by cutting out the outer wall of the motor case 10 and is formed by the outer wall of the motor case 10 and the lower end surface 171 of the inverter case 17, the oil cooler 83 is disposed between the motor case 10 and the inverter case 17. Accordingly, the oil cooler 83 is disposed without greatly protruding from the motor case 10 and the inverter case 17, and contributes to a reduction in dimension of the unit 1.

The recess 90, which is the accommodation portion for the oil cooler 83, is formed by cutting out the outer wall of the motor case 10. The main body portion 830 is accommodated in the recess 90, and the tabs 835 and the pipes Pa, Pb, Pc, and Pd provided on the side surface portion 833*d* protrude to the outside from the opening 93 (see FIG. 11) of the recess 90.

As illustrated in FIG. 11, the tip portion 835*b* of the tab 835 provided at the upper end of the side surface portion 833*d* protrudes upward in the vertical line VL direction from the side surface portion 833*d* and faces the outer wall of the inverter case 17 in the width direction. The tip portion 835*b* of the tab 835 provided at the lower end of the side surface portion 833*d* protrudes downward in the vertical line VL direction from the side surface portion 833*d* and faces the outer wall of the inverter case 17 in the width direction.

The oil cooler 83 overlaps with the motor case 10 or the inverter case 17 at the tip portion 835*b* of the tab 835 when viewed in an intersection direction intersecting the vertical line VL direction (gravity direction) and the rotation axis X, that is, the width direction.

The tab 835 can be easily fixed to the outer wall of the motor case 10 or the inverter case 17 with the bolt B by using the tip portion 835*b* of the tab 835 facing the motor case 10 or the inverter case 17 as a seating surface of the bolt B and providing the insertion hole 835*c* for the bolt B.

Since the pipes Pa to Pd provided on the side surface portion 833*d* protrude from the opening 93, a pipe or the like can be easily attached. Installation work of the unit 1 can be facilitated.

As described above, the unit 1 according to the embodiment has the following configurations.

(1) The unit 1 includes
the oil cooler 83 (heat exchanger),
the motor case 10 that accommodates the motor 2, and
the inverter case 17 that accommodates the inverter 7.

When viewed in the vertical line VL direction (when viewed in the gravity direction), which is the predetermined direction, the inverter case 17 has a portion that overlaps the oil cooler 83 and the motor case 10.

This configuration contributes to a reduction in dimension of the unit 1 on which the oil cooler 83 is mounted, at least in one direction.

Specifically, in the 3-in-1 unit in which the inverter case 17 is joined to the motor case 10, the recess 90 is provided by cutting out the outer wall surface of the upper portion 101 of the motor case 10, and the main body portion 830 of the oil cooler 83 is accommodated therein. Accordingly, the main body portion 830 of the oil cooler 83 overlaps the inverter case 17 and the motor case 10 when viewed in the vertical line VL direction (when viewed in the gravity direction). The oil cooler 83 is disposed without greatly protruding from the motor case 10 and the inverter case 17. This contributes to a reduction in dimension of the unit 1 at least in the rotation axis X direction.

(2) The oil cooler 83 has a portion sandwiched between the motor case 10 and the inverter case 17.

The recess 90 that accommodates the oil cooler 83 is provided by cutting out the outer wall surface of the motor case 10. The upper wall surface 91 of the recess 90 is formed by the lower end surface 171 of the inverter case 17 (see FIG. 10 and FIG. 11). The bottom wall surface 92 and the side wall surfaces 94*a*, 94*b*, 94*c* of the recess 90 are formed by the outer wall surface of the motor case 10. That is, the main body portion 830 of the oil cooler 83 is disposed between the motor case 10 and the inverter case 17. With this configuration, the oil cooler 83 is disposed without greatly protruding from the motor case 10 and the inverter case 17, which contributes to a reduction in dimension of the unit 1.

(3) When viewed in the width direction (intersection direction) intersecting the predetermined direction (vertical line VL direction), the oil cooler 83 includes the tab 835 that overlaps the motor case 10 and/or the inverter case 17.

By providing such tab 835 on the oil cooler 83 and, for example, providing an insertion hole in the tab 835 and using the insertion hole as a seating surface for a fastener such as the bolt B, the oil cooler 83 can be easily fixed to the motor case 10 and the inverter case 17, and assemblability of the oil cooler 83 can be improved.

Instead of using the tab 835 as the seating surface for the fastener, or in addition to using the tab 835 as the seating surface, the tab 835 may be used as a stopper to be fastened to the outer wall surface.

In either case, it can be said that the oil cooler 83 is fastened to the motor case 10 and/or the inverter case 17 via the tabs 835.

(4, 5) The inverter case 17 has a portion integrally formed with the motor case 10.

In the so-called 3-in-1 unit, there is a connection portion between the inverter case 17 and the motor case 10. For example, the upper portion 101 of the motor case 10 is a connection portion with the inverter case 17. The inverter case 17 includes the connection portion as a portion formed integrally with the motor case 10. By disposing the oil cooler 83 using the space (the recess 90) from which a part of the connection portion is removed, the oil cooler 83 can be easily sandwiched between the motor case 10 and the inverter case 17.

(6) The longitudinal direction of the oil cooler 83 extends along the longitudinal direction of the inverter case 17.

Accordingly, the oil cooler 83 is prevented from greatly protruding from the inverter case 17 in the longitudinal direction, which contributes to reduction in the dimension of the unit 1.

The aspect in which the oil cooler 83 is disposed so as to overlap the motor case 10 and the inverter case 17 when viewed in the predetermined direction is not limited to the aspect in the embodiment. Hereinafter, modifications will be described.

Modification 1

Figure 12:
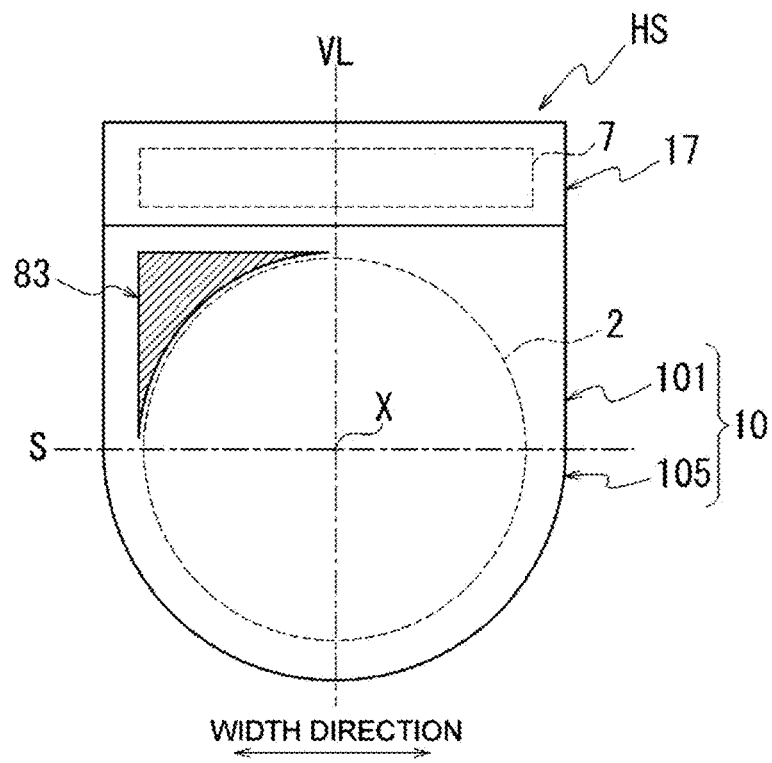
FIG. 12 is a diagram illustrating a unit according to Modification 1.

FIG. 12 is a diagram illustrating a unit according to Modification 1.

The drawings used in the following modifications are schematic diagrams illustrating disposition of the oil cooler 83. The housing HS is simplified, and only the motor case 10 and the inverter case 17 are schematically illustrated. The oil cooler 83 is indicated by hatching.

As illustrated in FIG. 12, in Modification 1, the oil cooler 83 is disposed in the motor case 10. Although not illustrated, a housing chamber for accommodating the oil cooler 83 may be provided in the motor case 10.

Also in Modification 1, similarly to the embodiment, the oil cooler 83 is disposed in the clearance formed between the rectangular upper portion 101 and the circular motor 2 when viewed in the rotation axis X direction. In order to effectively utilize this clearance, the oil cooler 83 may have a triangular prism shape. Here, a surface of the oil cooler 83 facing the outer periphery of the circular motor 2 when viewed in the rotation axis X direction may have an arc shape.

The oil cooler 83 is not limited to the triangular prism shape, and for example, the oil cooler 83 having a columnar shape or a rectangular parallelepiped shape may be disposed inside the motor case 10. Further, the oil cooler 83 is not limited to the example in which the oil cooler 83 is disposed on the end portion 101*b* side of the upper portion 101. For example, the oil cooler 83 may be disposed in the motor case 10 above the motor 2 in the vertical line VL direction so as to extend from the end portion 101*a* side to the end portion 101*b* side.

Also in Modification 1, similarly to the embodiment, the oil cooler 83 overlaps the motor case 10 and the inverter case 17 when viewed in the vertical line VL direction (when viewed in the gravity direction) which is the predetermined direction. This contributes to a reduction in dimension of the unit 1 at least in the rotation axis X direction.

Modification 2

Figure 13:
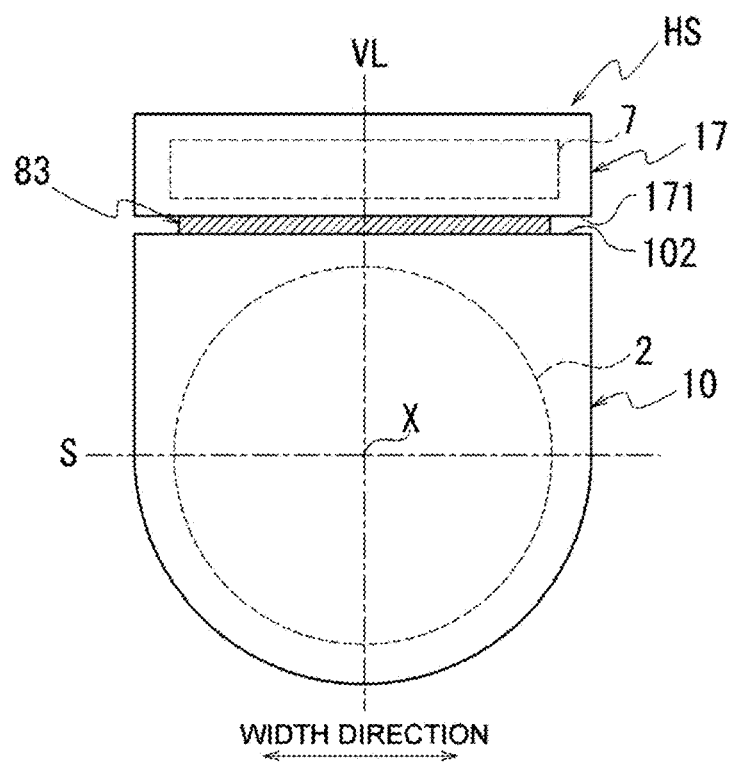
FIG. 13 is a diagram illustrating a unit according to Modification 2.

FIG. 13 is a diagram illustrating a unit according to Modification 2.

As illustrated in FIG. 13, in Modification 2, the oil cooler 83 is disposed between the motor case 10 and the inverter case 17. The oil cooler 83 is joined to the upper end surface 102 of the motor case 10 and the lower end surface 171 of the inverter case 17. In Modification 2, the inverter case 17 is connected to the motor case 10 via the oil cooler 83.

In Modification 2, a pipe for connecting the cooling path CP2 (see FIG. 3) in the inverter case 17 and the cooling path CP1 (see FIG. 3) in the motor case 10 may be separately provided.

Also in Modification 2, similarly to the embodiment, the oil cooler 83 overlaps the motor case 10 and the inverter case 17 when viewed in the vertical line VL direction (when viewed in the gravity direction) which is the predetermined direction. The oil cooler 83 is sandwiched between the motor case 10 and the inverter case 17. This contributes to a reduction in dimension of the unit 1 at least in the rotation axis X direction.

The upper end surface 102 of the motor case 10 may be provided with the recess 90, and the oil cooler 83 may be disposed in the recess 90.

Modification 3

Figure 14:
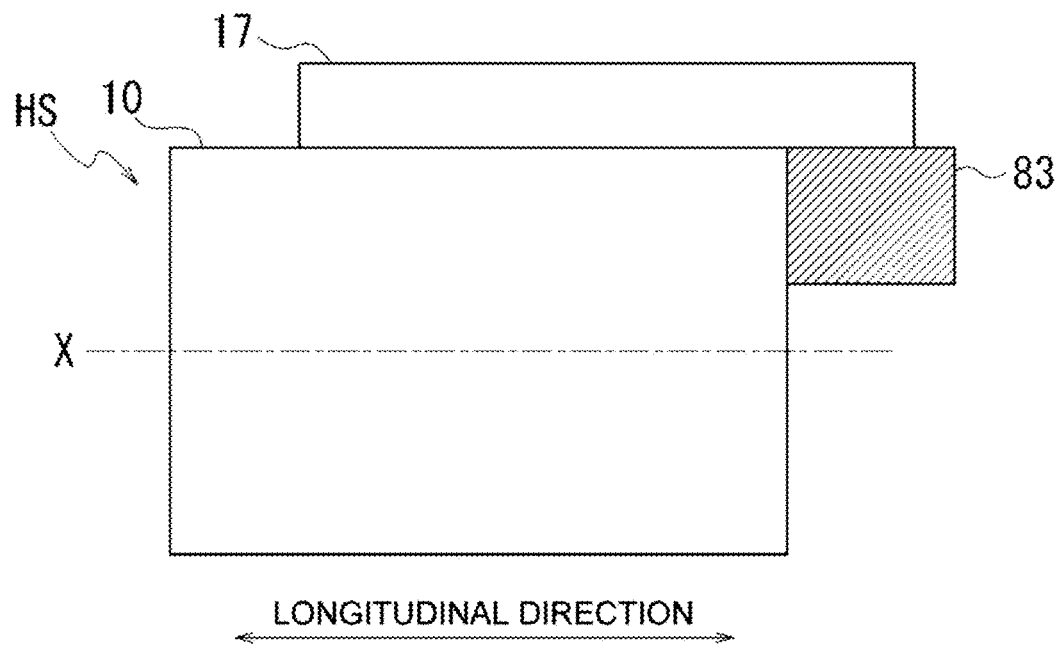
FIG. 14 is a diagram illustrating a unit according to Modification 3.

FIG. 14 is a diagram illustrating a unit according to Modification 3.

As illustrated in FIG. 14, in Modification 3, a part of the inverter case 17 is disposed to be offset with respect to the motor case 10 in the longitudinal direction. The oil cooler 83 is disposed below an offset portion of the inverter case 17 in the vertical line VL direction and adjacent to the motor case 10. That is, the oil cooler 83 has a portion that overlaps the inverter case 17 when viewed in the vertical line VL direction (when viewed in the predetermined direction) and a portion that overlaps the motor case 10 when viewed in the rotational axis X direction (when viewed in the predetermined direction).

By disposing the oil cooler 83 so as to overlap the portion of the inverter case 17 offset from the motor case 10 in this manner, the oil cooler 83 can be disposed without greatly protruding from the inverter case 17, which contributes to a reduction in dimension of the unit 1.

Modification 4

Figure 15:
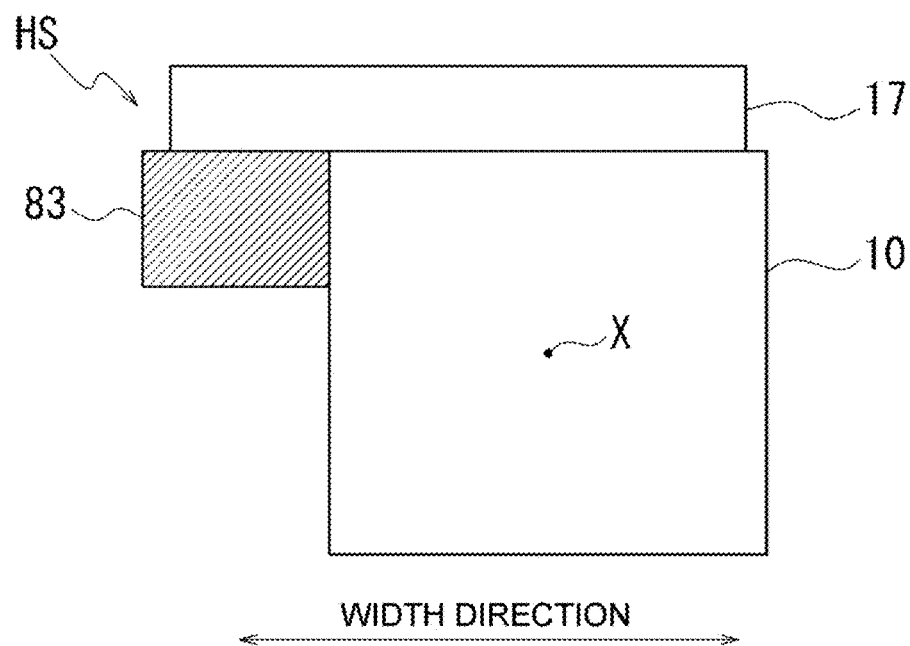
FIG. 15 is a diagram illustrating a unit according to Modification 4.

FIG. 15 is a diagram illustrating a unit according to Modification 4. In FIG. 15, the motor case 10 is simplified and illustrated as rectangular parallelepiped.

As illustrated in FIG. 15, in Modification 4, a part of the inverter case 17 is arranged to be offset with respect to the motor case 10 in the width direction. The oil cooler 83 is disposed below an offset portion of the inverter case 17 in the vertical line VL direction and adjacent to the motor case 10. That is, the oil cooler 83 has a portion that overlaps the inverter case 17 when viewed in the vertical line VL direction (when viewed in the predetermined direction) and a portion that overlaps the motor case 10 when viewed in the width direction (when viewed in the predetermined direction) intersecting the vertical line VL direction and the rotation axis X direction.

By disposing the oil cooler 83 so as to overlap the portion of the inverter case 17 offset from the motor case 10 in this manner, the oil cooler 83 can be disposed without greatly protruding from the inverter case 17, which contributes to a reduction in dimension of the unit 1.

Modification 5

Figure 16:
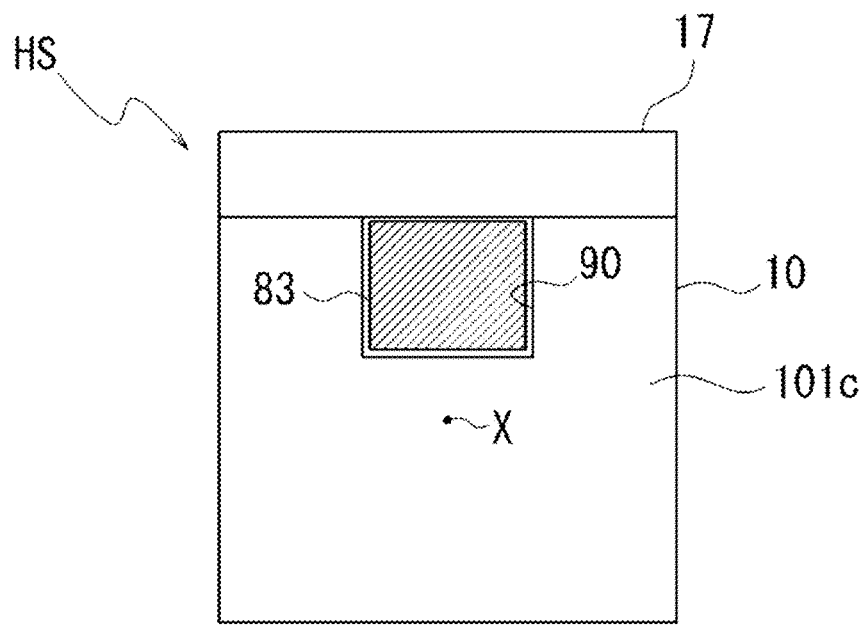
FIG. 16 is a diagram illustrating a unit according to Modification 5.

FIG. 16 is a diagram illustrating a unit according to Modification 5. In FIG. 15, the motor case 10 is simplified and illustrated as rectangular parallelepiped.

In the embodiment, an example has been described in which the recess 90 that accommodates the oil cooler 83 is provided at the end portion 101*b* (see FIG. 8) of the motor case 10 extending in the width direction, and the present invention is not limited thereto. As illustrated in FIG. 16, the recess 90 may be provided at the end portion 101*c* of the motor case 10 extending in the rotation axis X direction.

Also in Modification 5, similarly to the embodiment, the oil cooler 83 overlaps the motor case 10 and the inverter case 17 when viewed in the vertical line VL direction (when viewed in the gravity direction) which is the predetermined direction. The oil cooler 83 is sandwiched between the motor case 10 and the inverter case 17. This contributes to a reduction in dimension of the unit 1 at least in the rotation axis X direction.

As a further modification, for example, the oil cooler 83 may be disposed below the motor case 10. Further, for example, the oil cooler 83 may be disposed above the inverter case 17. Also in this case, the oil cooler 83 overlaps with the motor case 10 and the inverter case 17 when viewed in the vertical line VL direction (when viewed in the gravity direction) which is the predetermined direction, which contributes to a reduction in dimension of the unit 1 at least in the rotation axis X direction.

In an aspect of the present invention, the power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism 5 is, for example, a bevel gear type differential gear or a planetary gear type differential gear.

The differential mechanism 5 includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is not a stepped pinion gear.

In the present embodiment, an aspect in which the unit 1 according to an aspect of the present invention is mounted on a vehicle has been described, and the present invention is not limited to this aspect. The present invention can be applied to other than vehicles. When a plurality of examples and modifications are described in the present embodiment, these examples and modifications may be freely combined.

While an embodiment of the invention has been described, the embodiment is merely one of application examples of the invention, and does not intend to limit a technical scope of the invention to a specific configuration according to the embodiment. Within the scope of the technical concept of the invention, modifications can be made as appropriate.

The present application claims a priority of Japanese Patent Application No. 2021-105239 filed with the Japan Patent Office on Jun. 24, 2021, all the contents of which are hereby incorporated by reference.

DESCRIPTION OF REFERENCE SIGNS 1 unit
2 motor
7 inverter
10 motor case
17 inverter case
83 oil cooler (heat exchanger)
835 tab
VL vertical line

The invention claimed is:

1. A unit comprising:
a heat exchanger;
a motor case configured to accommodate a motor; and
an inverter case configured to accommodate an inverter, wherein
the heat exchanger is composed of a separate component from the motor case and the inverter case, and
the inverter case has a portion that overlaps the heat exchanger and the motor case when viewed in a predetermined direction.

2. The unit according to claim 1, wherein
the heat exchanger has a portion sandwiched between the motor case and the inverter case.

3. The unit according to claim 2, wherein
the heat exchanger includes a tab that overlaps the motor case and/or the inverter case when viewed in an intersection direction intersecting the predetermined direction.

4. The unit according to claim 2, wherein
the inverter case has a portion integrally formed with the motor case.

5. The unit according to claim 3, wherein
the inverter case has a portion integrally formed with the motor case.

6. The unit according to claim 1, wherein
a longitudinal direction of the heat exchanger extends along a longitudinal direction of the inverter case.

7. A unit comprising:
a heat exchanger;
a motor case configured to accommodate a motor; and
an inverter case configured to accommodate an inverter, wherein
the inverter case has a portion that overlaps the heat exchanger and the motor case when viewed in an intersection direction intersecting an axial direction, and
the heat exchanger has a portion sandwiched between the inverter case and the motor case in the intersection direction.

8. The unit according to claim 1, wherein
the heat exchanger has a portion accommodated in a recess provided in an outer wall of the motor case.

9. The unit according to claim 1, wherein
the heat exchanger is offset with respect to the motor case when viewed in the predetermined direction.

10. The unit according to claim 1, wherein
a main body portion of the heat exchanger has a rectangular parallelepiped shape.

11. A unit comprising:
a heat exchanger;
a motor case configured to accommodate a motor; and
an inverter case configured to accommodate an inverter, wherein
the inverter case has a portion that overlaps the heat exchanger and the motor case when viewed in an intersection direction intersecting an axial direction, and
the heat exchanger has a portion accommodated in a recess provided in an outer wall of the motor case.

12. A unit comprising:
a heat exchanger;
a motor case configured to accommodate a motor; and
an inverter case configured to accommodate an inverter, wherein
the inverter case has a portion that overlaps the heat exchanger and the motor case when viewed in an intersection direction intersecting an axial direction, and
the heat exchanger is offset with respect to the motor case when viewed in a predetermined direction.

* * * * *